United States Patent
Ferri et al.

(10) Patent No.: US 10,150,348 B2
(45) Date of Patent: Dec. 11, 2018

(54) AIRFLOW CONTROL SYSTEM OF A WORK VEHICLE

(71) Applicant: CNH Industrial America LLC, New Holland, PA (US)

(72) Inventors: Doriano Ferri, Brussels (BE); Joaquim Guitart Corominas, Barcelona (ES); Tiziano Salvini, Tribiano (IT); Jigarkumar N. Patel, West Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 160 days.

(21) Appl. No.: 15/391,581

(22) Filed: Dec. 27, 2016

(65) Prior Publication Data

US 2018/0178627 A1    Jun. 28, 2018

(51) Int. Cl.
*G06F 19/00*  (2018.01)
*B60H 1/00*   (2006.01)

(52) U.S. Cl.
CPC ..... *B60H 1/00849* (2013.01); *B60H 1/00378* (2013.01); *B60H 1/00735* (2013.01)

(58) Field of Classification Search
CPC ............ B60H 1/00849; B60H 1/00735; B60H 1/00378
See application file for complete search history.

(56) References Cited

U.S. PATENT DOCUMENTS

| | | | |
|---|---|---|---|
| 4,467,706 A | | 8/1984 | Batcheller et al. |
| 4,742,760 A | * | 5/1988 | Horstman ............. B64D 13/00 244/118.5 |
| 6,991,674 B2 | | 1/2006 | Dietrich |
| 7,377,848 B2 | | 5/2008 | Voit, II et al. |
| 7,681,630 B2 | | 3/2010 | Klassen et al. |
| 7,832,223 B2 | | 11/2010 | Krshad et al. |
| 8,056,617 B2 | | 11/2011 | Klassen et al. |
| 8,641,490 B2 | | 2/2014 | Eisenhour |
| 8,893,517 B2 | | 11/2014 | Madhavan et al. |
| 8,939,823 B2 | | 1/2015 | Kanemaru et al. |
| 2004/0231350 A1 | * | 11/2004 | Kline .................... B64D 13/00 62/244 |
| 2008/0183334 A1 | * | 7/2008 | Greiner ............. B60H 1/00964 700/276 |

(Continued)

FOREIGN PATENT DOCUMENTS

CN    202859540    4/2013

*Primary Examiner* — Ian Jen
(74) *Attorney, Agent, or Firm* — Rickard K. DeMille; Rebecca L. Henkel

(57) ABSTRACT

A controller of an airflow control system is configured to determine a target position of a door of an airflow control assembly, a first flow rate of a first airflow from a recirculated air blower, and a second flow rate of a second airflow from a fresh air blower based at least in part on a target total airflow rate into an interior of a and a target fresh airflow rate into the interior of the cab. The fresh air blower receives a mixture of fresh air and recirculated air based on a position of the door. The controller is further configured to instruct the airflow control assembly to move the door to the target position, instruct the recirculated air blower to output the first airflow at the first flow rate, and instruct the fresh air blower to output the second airflow at the second flow rate.

20 Claims, 5 Drawing Sheets

(56) References Cited

U.S. PATENT DOCUMENTS

| | | |
|---|---|---|
| 2010/0190429 A1 | 7/2010 | Dage |
| 2011/0244776 A1 | 10/2011 | Jordan |
| 2012/0003911 A1 | 1/2012 | Geiss et al. |
| 2013/0137355 A1 | 5/2013 | Patti et al. |
| 2013/0239599 A1 | 9/2013 | Pursifull et al. |
| 2014/0378042 A1 | 12/2014 | Koberstein et al. |
| 2015/0251521 A1 | 9/2015 | Brauer et al. |
| 2018/0178627 A1* | 6/2018 | Ferri .................. B60H 1/00849 |

* cited by examiner

| TARGET FRESH AIRFLOW RATE (m³/hr) | TARGET TOTAL AIRFLOW RATE (m³/hr) | | |
|---|---|---|---|
| | 150 | 200 | 250 |
| 30 | DOOR POSITION<br>R BLOWER CAPACITY<br>F BLOWER CAPACITY | DOOR POSITION<br>R BLOWER CAPACITY<br>F BLOWER CAPACITY | DOOR POSITION<br>R BLOWER CAPACITY<br>F BLOWER CAPACITY |
| 60 | DOOR POSITION<br>R BLOWER CAPACITY<br>F BLOWER CAPACITY | DOOR POSITION<br>R BLOWER CAPACITY<br>F BLOWER CAPACITY | DOOR POSITION<br>R BLOWER CAPACITY<br>F BLOWER CAPACITY |
| 90 | DOOR POSITION<br>R BLOWER CAPACITY<br>F BLOWER CAPACITY | DOOR POSITION<br>R BLOWER CAPACITY<br>F BLOWER CAPACITY | DOOR POSITION<br>R BLOWER CAPACITY<br>F BLOWER CAPACITY |

FIG. 3

AIRFLOW CONTROL SYSTEM OF A WORK VEHICLE

BACKGROUND

The present disclosure relates generally to an airflow control system of a work vehicle.

Certain work vehicles (e.g., tractors, harvesters, skid steers, etc.) include a heating, ventilation, and air condition (HVAC) system configured to control an airflow into a cab of the work vehicle. In addition, the HVAC system is configured to filter the fresh air that enters the cab, as well as keep the cab pressurized to block contaminants from entering the cab through gaps in the cab sealing. Certain HVAC systems include an HVAC blower configured to provide heated or cooled air to the cab of the work vehicle, and a separate pressurization blower configured to pressurize the cab of the work vehicle. A capacity of the pressurization blower may not be adjustable (e.g., the pressurization blower may operate at a max capacity), leading to wasted energy and/or a reduced longevity of a fresh air filter.

BRIEF DESCRIPTION

In one embodiment, an airflow control system of a work vehicle includes a controller configured to determine a target position of a door of an airflow control assembly, a first flow rate of a first airflow from a recirculated air blower, and a second flow rate of a second airflow from a fresh air blower based at least in part on a target total airflow rate into an interior of a cab of the work vehicle and a target fresh airflow rate into the interior of the cab. The airflow control assembly is configured to provide the fresh air blower with a mixture of fresh air and recirculated air, and the mixture of the fresh air and the recirculated air is based on a position of the door of the airflow control assembly. The controller is further configured to instruct the airflow control assembly to move the door to the target position, instruct the recirculated air blower to output the first airflow at the first flow rate, and instruct the fresh air blower to output the second airflow at the second flow rate.

In another embodiment, an airflow control system of a work vehicle includes an airflow control assembly having a door. The door of the airflow control assembly is configured to provide a fresh air blower with a fresh airflow comprising a mixture of fresh air and recirculated air. The mixture of the fresh air and the recirculated air of the fresh airflow is based on a position of the door. The airflow control system of the work vehicle includes the fresh air blower configured to establish the fresh airflow from the airflow control assembly. Additionally, the airflow control system of the work vehicle includes a recirculated air blower configured to establish a recirculated airflow from an interior of a cab of the work vehicle. Further, the airflow control system of the work vehicle includes a pressure sensor fluidly coupled to the interior of the cab and configured to send a first signal representative of the pressure within the cab to a controller of the airflow control system. Additionally, the airflow control system includes the controller having a memory and a processor. The controller is communicatively coupled to the pressure sensor, the recirculated air blower, the fresh air blower, and the airflow control assembly. The controller is configured to determine a target position of the door, a first flow rate of the recirculated airflow from the recirculated air blower, and a second flow rate of the fresh airflow from the fresh air blower based at least in part on a target total airflow rate into the interior of the cab and a target fresh airflow rate into the interior of the cab. The controller is also configured to instruct the airflow control assembly to move the door to the target position, instruct the recirculated air blower to output the recirculated airflow at the first flow rate, and instruct the fresh air blower to output the fresh airflow at the second flow rate.

In a further embodiment, a method for controlling an airflow through an interior of a cab of a work vehicle includes determining, via a controller, a target position of a door of an airflow control assembly, a first flow rate of a first airflow from a recirculated air blower, and a second flow rate of a second airflow from a fresh air blower based at least in part on a target total airflow rate into an interior of the cab of the work vehicle and a target fresh airflow rate into the interior of the cab. The airflow control assembly is configured to provide the fresh air blower with a mixture of fresh air and recirculated air, and the mixture of the fresh air and the recirculated air is based on a position of the door. The method also includes instructing, via the controller, the airflow control assembly to move the door to the target position. Additionally, the method includes instructing, via the controller, the recirculated air blower to output the first airflow at the first flow rate and instructing, via the controller, the fresh air blower to output the second airflow at the second flow rate.

DRAWINGS

These and other features, aspects, and advantages of the present disclosure will become better understood when the following detailed description is read with reference to the accompanying drawings in which like characters represent like parts throughout the drawings, wherein:

FIG. 3 is an embodiment of a lookup table that may be utilized by a controller of the airflow control system of FIG. 2;

DETAILED DESCRIPTION

Figure 1:
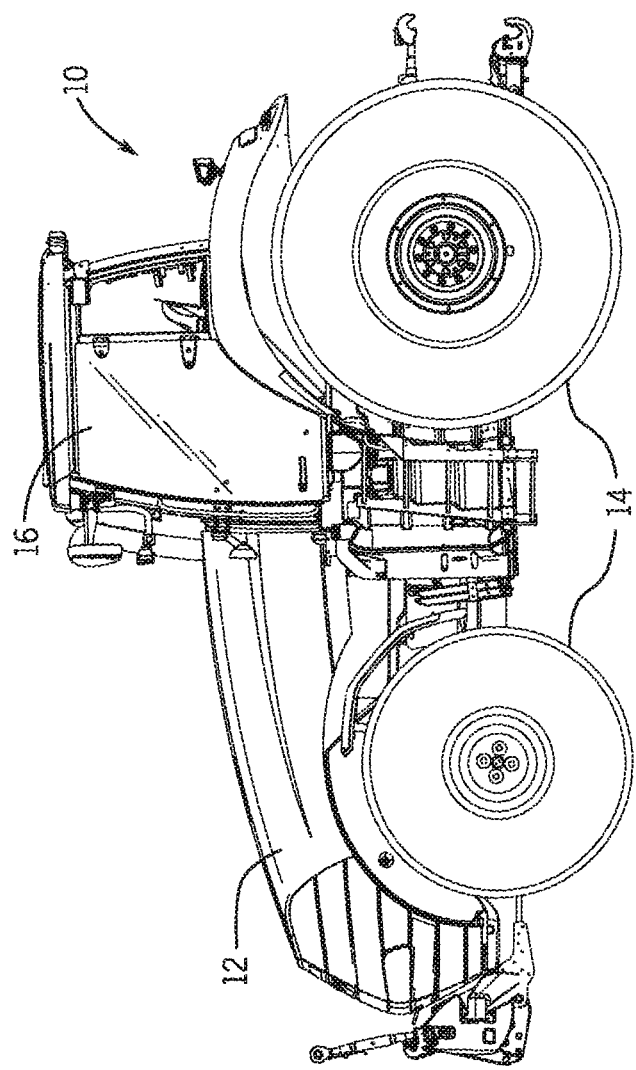
FIG. 1 is a side view of an embodiment of a work vehicle that may include an airflow control system.

Turning now to the drawings, FIG. 1 is a side view of an embodiment of a work vehicle 10 that may include an airflow control system. In the illustrated embodiment, the work vehicle 10 includes a body 12 configured to house an engine, a transmission, other systems of the work vehicle 10, or a combination thereof. In addition, the work vehicle 10 includes wheels 14 configured to be driven by the engine and transmission, thereby driving the work vehicle 10 along a field, a road, or any other suitable surface. In the illustrated embodiment, the work vehicle 10 includes a cab 16 configured to house an operator. As discussed in detail below, the work vehicle may include a heating, ventilation, and air conditioning (HVAC) system configured to control an air temperature within the cab and/or to pressurize the cab. Pressurizing the cab may substantially reduce ingress of dirt and/or other contaminants, enhance passenger comfort, reduce noise, or a combination thereof. In certain embodiments, the HVAC system includes an airflow control system having a controller configured to determine a target position of a door of an airflow control assembly of the airflow control system, a target airflow from a recirculated air blower of the airflow control system, and a target airflow from a fresh air blower of the airflow control system, then instruct the door, the recirculated air blower, and the fresh air blower to operate at their respective targets. In certain embodiments, the airflow control assembly is configured to provide the fresh air blower with a mixture of fresh air and recirculated air, and the mixture of the fresh air and the recirculated air is based on a position of the door of the airflow control assembly. In this manner, the controller may determine the target airflow from the fresh air blower at least partially from a target pressure within the cab 16. While the illustrated work vehicle 10 is a tractor, it should be appreciated that the airflow control system described below may be employed within any suitable work vehicle, such as a harvester, a sprayer, or a skid steer.

Figure 2:
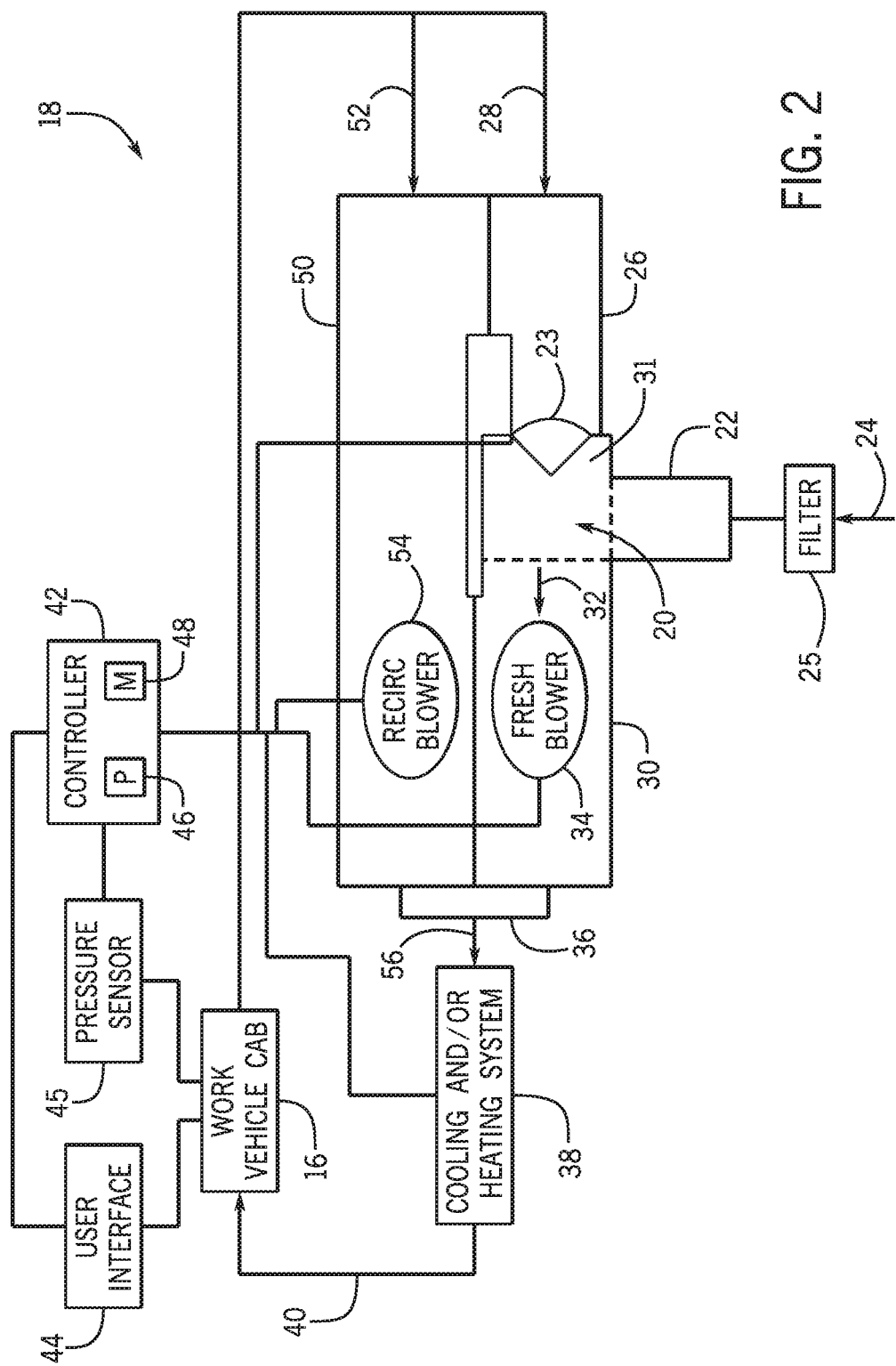
FIG. 2 is a schematic diagram of an embodiment of an airflow control system that may be employed within the work vehicle of FIG. 1.

FIG. 2 is a schematic diagram of an embodiment of an airflow control system 18 that may be employed within the work vehicle of FIG. 1. In the illustrated embodiment, the airflow control system 18 includes an airflow control assembly 20 configured to control mixing of air from an environment external to the cab 16 with air recirculated from the cab 16. The airflow control assembly 20 includes a body 31 having a first inlet 22 configured to receive a first airflow 24 that flows through a filter 25 from the environment external to the cab 16, and a second inlet 26 configured to receive a second airflow 28 from an interior of the cab 16. The body 31 of the airflow control assembly 20 also includes an outlet 30 configured to output a third airflow 32 to a fresh air blower 34 (e.g. pressurization blower). In certain embodiments, the airflow control assembly 20 includes a door 23 disposed within the body 31 and configured to rotate relative to the body 31 to control the first airflow 24 through the first inlet 22 and the second airflow 28 through the second inlet 26, thereby mixing the external air with the recirculated air.

The filter 25 may filter contaminants (e.g., dust fertilizer, etc.) from the first airflow 24. The filter 25 collects contaminants that would otherwise flow into the cab 16 of the work vehicle. In certain embodiments, the filter 25 includes internal components for capturing and/or blocking particulate matter and/or debris, and/or for filtering finer matter such as dust from the air, while permitting air to flow through the first inlet 22 to the airflow control assembly 20. The contaminants may collect on a surface and/or in an interior of the filter 25 and clog the filter over time. With a clogged filter, the airflow control system 18 may use more energy to draw the air into the cab, as compared to a clean filter 25. Once clogged, the filter may be cleaned or replaced to reduce the energy utilized by the airflow control system 18 to draw the first airflow 24 into the cab 16. In other embodiments, the cab 16 may operate without a filter 25.

The door 23 of the airflow control assembly 20 may move (e.g., rotate) to a first position, a second position, and intermediate positions between the first and second positions. The first position of the door 23 is open relative to the first inlet 22 and closed relative to the second inlet 26. The first position of the door 23 is rotated away from the first inlet 22 so the first airflow 24 flows from the external environment into the airflow control assembly 20. The second airflow 28, which originates from the cab 16, is substantially blocked from flowing into the airflow control assembly 20. Accordingly, the third airflow 32 output from the airflow control assembly 20 includes all or mostly fresh air. A maximum ratio of fresh air to recirculated air is therefore supplied to the cab 16. In the second position, the door 23 is closed relative to the first inlet 22 and open relative to the second inlet 26. In the second position, the second airflow 28 flows into the airflow control assembly 20 while the fresh first airflow 24 is substantially blocked from entering the airflow control assembly 20. Accordingly, the third airflow 32 output from the airflow control assembly 20 includes all or mostly recirculated air. In the intermediate positions, portions of the airflow from both the first inlet 22 and the second inlet 26 are blocked. The amount each inlet is blocked depends on the position of the door 23. For example, if the door is in an intermediate position closer to the first position than to the second position, the flow from the second inlet 26 may be more obstructed than the flow from the first inlet 22, resulting in more fresh air than recirculated air entering the airflow control assembly 20.

In the illustrated embodiment, the airflow control system 18 includes the fresh air blower 34, which is configured to receive the third airflow 32 from the airflow control assembly 20 and to establish a fourth airflow 36 based on a capacity of the fresh air blower 34. Further, the airflow control system 18 includes a recirculation channel 50 configured to receive a fifth airflow 52 from the interior of the cab 16. The fifth airflow 52 flows into a recirculated air blower 54 disposed in the recirculation channel 50.

A sixth airflow 56, which includes a mixture of the airflow output from the recirculation blower 54 and the fresh air blower 34, is output to a cooling and/or heating system 38. The sixth airflow 56 provides the cab 16 with a requested total airflow (e.g., based on input from a user interface) and the target fresh airflow (e.g., based on a target pressure within the cab 16). Accordingly, moving the door 23 between the first and second positions controls the ratio of external/fresh air to recirculated air that flows into the cab 16, thereby controlling the air pressure within the cab 16. Further, the capacities of the blowers 34, 54 may be adjusted by the controller 42 to control the total airflow into the cab 16 and the fresh airflow into the cab.

While the illustrated airflow control assembly 20 includes a door 23 having an arcate cross-section, it should be appreciated that in alternative embodiments, the door 23 may be formed in other shapes. For example, in certain embodiments, the door 23 may have a cross-section of a different shape (e.g. a section of an ellipse, a section of a diamond, a section of a trapezoid, etc.). In addition, while the illustrated embodiment has one door 23 that rotates between two inlets, it should be appreciated that in alternative embodiments, the airflow control assembly 20 may include two doors, in which each door blocks a respective inlet. Furthermore, while the illustrated airflow control assembly 20 is disposed in the same housing as the blowers 34, 54, it should be appreciated that these components may be separated into respective housings.

In certain embodiments, the airflow output from the recirculation blower 54 and the airflow output from the fresh air blower 34 may mix inside the cooling and/or heating system 38. In other embodiments, the airflow output from the recirculation blower 54 and the airflow output from the fresh air blower 34 may be cooled and/or heated separately, then mix inside the cab 16. Additionally, the airflow output from the recirculation blower 54 and the airflow output from the fresh air blower 34 may mix inside a mixing device upstream of the heating and/or cooling system 38, or at any other location within the airflow control system 18.

The cooling and/or heating system 38 is configured to receive the sixth airflow 56 and to output a seventh airflow 40 having a higher or lower temperature than the sixth airflow 56. As illustrated, the seventh airflow 40 flows into the cab 16 of the work vehicle. During certain operating conditions, the cooling and/or heating system 38 may be deactivated. As a result, the temperature of the seventh airflow 40 may be substantially equal to the temperature of the sixth airflow 56. The heating and/or cooling system 38 may include a heater core of a heating system and/or an evaporator of a refrigeration system, among other heating and/or cooling devices/systems. In certain embodiments, the cooling and/or heating system may be omitted, and the sixth airflow 56 may flow directly into the cab 16.

In the illustrated embodiment, the airflow control system 18 includes a controller 42 communicatively coupled to the airflow control assembly 20, the blowers 34, 54, and the cooling and/or heating system 38. The controller 42 may be configured to instruct an actuator of the airflow control assembly 20 to control a position of the door 23, thereby controlling the mixing of the external air with the recirculated air. The controller 42 may be configured to control the cooling and/or heating system 38 to control the temperature of the airflow 40 to the cab 16. In addition, the controller 42 may be configured to control an output (e.g., capacity, voltage) of the blowers 34, 54, thereby controlling the flowrate of the airflow 40 to the cab 16. As discussed herein, reference to adjustments to the capacities of the blowers 34, 54 relates to adjustments to the airflows output by the blowers. In some embodiments, the capacities of the blowers 34, 54 may be adjusted by multiple methods, including but not limited to: adjusting the voltage input to the blowers 34, 54, adjusting the angles of blades that may be disposed inside the blowers 34, 54, or any other suitable adjustment to the blowers 34, 54 that adjusts the output of the blowers 34, 54.

In the illustrated embodiment, the controller 42 is communicatively coupled to a user interface 44. The user interface 44 may be located within the cab 16 of the work vehicle 10 and may be configured to receive input from the operator, such as input for controlling the flowrate and/or temperature of the airflow 40. In the illustrated embodiment, the controller 42 is also communicatively coupled to a pressure sensor 45. The pressure sensor 45 is fluidly coupled to the cab 16 and configured to output a signal indicative of the pressure within the cab 16. The pressure sensor 45 sends the signal to the controller 42. In certain embodiments, the airflow control system 18 may include additional pressure sensors to measure pressure within the air control assembly 20 or the recirculation channel 50, for example.

In certain embodiments, the controller 42 is an electronic controller having electrical circuitry configured to process data from certain components of the airflow control system 18, such as the user interface 44 and the pressure sensor 45. In the illustrated embodiment, the controller 42 includes a processor, such as the illustrated microprocessor 46, and a memory device 48. The controller 42 may also include one or more storage devices and/or other suitable components. The processor 46 may be used to execute software, such as software for controlling the Airflow control system 18, and so forth. Moreover, the processor 46 may include multiple microprocessors, one or more "general-purpose" microprocessors, one or more special-purpose microprocessors, and/or one or more application specific integrated circuits (ASICS), or some combination thereof. For example, the processor 46 may include one or more reduced instruction set (RISC) processors.

The memory device 48 may include a volatile memory, such as random access memory (RAM), and/or a nonvolatile memory, such as read-only memory (ROM). The memory device 48 may store a variety of information and may be used for various purposes. For example, the memory device 48 may store processor-executable instructions (e.g., firmware or software) for the processor 46 to execute, such as instructions for controlling the Airflow control system 18, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the HVAC, etc.), and any other suitable data.

As discussed in detail below, the controller 42 may determine a target position of the door 23, a target capacity of the recirculated air blower 54, and a target capacity of the fresh air blower 34. The targets may be determined based on a target fresh airflow rate and a target total airflow rate into the cab 16. The target fresh airflow rate may be determined based at least in part on a target air pressure within the cab 16. For example, the relationships between the target position of the door 23, the target capacity of the recirculated air blower 54, and the target capacity of the fresh air blower 34 to achieve various target total airflow rates and target fresh airflow rates may be determined by bench testing. The controller 42 may determine the target position of the door 23, the target capacity of the recirculated air blower 54, and/or the target capacity of the fresh air blower 34, then instruct the door 23 and the blowers 34, 54 independently to adjust to the target values.

The controller 42 may determine the target fresh airflow rate based on one or more air pressure targets. For example, during normal operation of the airflow control system 18, the controller 42 may determine a normal target pressure and may determine a target fresh airflow rate based on a pressure difference between a measured pressure within the cab 16 and the normal target pressure. The controller 42 may then control the airflow control assembly 20 and the blowers 34, 54 to move the door 23 and/or adjust the capacities of the blowers 34, 54 based on the target fresh airflow rate and the target total airflow rate. The adjustments may be made to achieve the target pressure within the cab (e.g., adjust the pressure within the cab 16 until it is within a threshold of the normal target pressure). For example, if the measured pressure within the cab is lower than the threshold, the target fresh airflow rate may be increased. Alternatively, if the measured pressure within the cab is higher than the threshold, the target fresh airflow rate may be decreased. In some embodiments, the adjustments may also be made until the pressure difference, instead of the measured pressure within the cab 16, is within a threshold. It is to be understood that all pressures disclosed herein are in gauge pressure relative to the pressure of the atmosphere. The normal target pressure may about 25 pascals, about 50 pascals, about 100 pascals, about 150 pascals, or any other suitable pressure. Moreover, in certain embodiments, the normal target pressure may be between 25 pascals and 300 pascals, 25 pascals and 150 pascals, 25 pascals and 100 pascals, or any other suitable range of pressures. The positive pressure substantially reduces ingress of contaminants though gaps in the seals of the cab 16.

During other modes of operations, such as a cool down phase, the target pressurization of the cab may be set to a lower value, such as a cool down phase target, which is a positive pressure that is lower than the normal target pressure. For example, the cool down phase target pressure may be about 5 pascals, about 10 pascals, about 20 pascals, about 25 pascals, about 35 pascals, or any other suitable pressure. Moreover, in certain embodiments, the cool down phase target pressure may between 5 pascals and 50 pascals, 10 pascals and 30 pascals, 15 pascals and 30 pascals, or any other suitable range of pressures. The cool down phase may be initiated (e.g., the cool down phase target pressure may be set) when the airflow control system 18 is cooling the cab 16 and a temperature difference between a measured temperature and a target temperature is greater than a temperature threshold. For example, the temperature threshold may be about 2 degrees Celsius, about 5 degrees Celsius, about 10 degrees Celsius, about 15 degrees Celsius, or any other suitable temperature difference for initiating the cool down phase. Additionally, the cool down phase may be initiated if the temperature difference is outside of a deadband from the temperature threshold. For example, the deadband may be about 1 degrees Celsius, about 3 degrees Celsius, about 5 degrees Celsius, or any other suitable deadband suitable for preventing the cool down phase from initiating until the temperature difference is greater than the deadband.

During portions of the year, such as summer, the air from the external environment is warmer than the target temperature of the cab 16. Therefore, the controller 42 prioritizes cooling the cab over maintaining the normal phase target pressure, and the cool down phase target pressure is set. With the lower target pressure set, the airflow control system 18 operates with less hot external air from airflow 24 and more recirculated airflow to cool the cab 16 faster. While two phase target pressures are disclosed herein, it should be appreciated that there may be more phase target pressures, such as a target for heating the cab 16, a target for saving energy, a target for operation in high altitudes, among others.

In the illustrated embodiment, the airflow control system 18 does not include an airflow sensor (e.g., mass airflow sensor, volumetric airflow sensor, etc.). Instead, the airflow control system 18 determines the target fresh airflow rate based on the pressure difference between the measured pressure and the target pressure (e.g., the normal phase target pressure or the cool down phase target pressure). In some embodiments, the target fresh airflow rate is calculated from the pressure difference by adjusting the fresh airflow rate until the pressure difference is within the threshold. Accordingly, the controller 42 controls the blowers 34, 54 and the airflow control assembly 20 to move the door 23 and/or adjust the capacities of the blowers 34, 54 until the measured pressure is within the threshold of the target pressure. In this manner, the cost of installing an airflow sensor in work vehicle 10 is eliminated.

FIG. 3 is an embodiment of a lookup table 80 that may be utilized by the controller 42 of the airflow control system 18 of FIG. 2. As illustrated, horizontal rows 88 represent values of target fresh airflow rates, vertical columns 90 represent values of target total airflow rates, and cells 92 correspond to each intersection of a respective row 88 and a respective column 90 and provide a target door position 82, a target recirculated air blower capacity 84, and a target fresh air blower capacity 86. The lookup table 80 may be stored in the controller, for example, in the memory of the controller. In certain embodiments, the target total airflow rate is determined based on an input from an operator of the work vehicle. For example, the operator may provide an input (e.g., to the user interface) indicative of a predetermined total airflow rate into the cab. In response, the controller selects the target total airflow rate based on the operator input. In certain embodiments, the total airflow rate may be determined automatically by the controller based on operating conditions of the work vehicle. The controller then automatically selects the target total airflow rate based on the automatic determination The target fresh airflow rate may be determined based on the target pressure and the measured pressure within the cab. In certain embodiments, the controller determines the pressure difference between the target pressure and the measured pressure within the cab. The controller may also determine the target fresh airflow rate by from the pressure difference by adjusting the fresh airflow rate until the pressure difference is within the threshold. The controller then uses the target fresh airflow rate and the target total airflow rate to identify the corresponding row 88 and column 90 of the lookup table 80. The identified row 88 and the identified column 90 coincide with a selected cell 92, which contains the target door position 82, the target recirculated air blower capacity 84, and the target fresh air blower capacity 86. Once the target door position 82 and the target capacities 84, 86 are determined, the controller 42 instructs the airflow control assembly to move the door to the target door position 82, and the blowers to operate at the target capacities 84, 86.

In certain embodiments, the target fresh airflow rate may be determined by adjusting the fresh airflow rate until the pressure difference between the measured pressure and the target pressure is reduced below a threshold value. For example, the controller may measure the pressure of the cab (e.g. receive a signal from the pressure sensor indicative of the pressure) after the airflow control assembly has moved the door to the target door position 82, and the blowers are operating at the target capacities 84, 86. The target capacities 84, 86 may be determined based on the determined target fresh airflow rate. If the measured pressure is not within a threshold of the target pressure, the controller may adjust (e.g. increment, decrement) the target fresh airflow rate by selecting the appropriate (e.g., corresponding, respective) target door position 82 and target capacities 84, 86 from the lookup table 80. The controller may pause for a period, then measure the pressure within the cab again. In some embodiments, the pause period duration may be about 1 second, about 5 seconds, about 60 seconds, or a different duration suitable for measuring the pressure within the cab. The controller may repeat the adjustments until the measured pressure is within the threshold of the target pressure. In some embodiments, the controller may utilize a stored target fresh airflow rate, and the adjustments to the target fresh airflow rate may be performed without first determining the target fresh airflow rate from the lookup table. In such embodiments, the stored target fresh airflow rate may be stored in the memory of the controller based on previously set target fresh airflow rates (E.g., the targets set during previous uses of the work vehicle), based on pre-loaded settings (e.g. manufacturer-specified settings), among others. However, determining the target fresh airflow rate from the lookup table 80 and using the adjustments may reduce the duration associated with reaching the target pressure.

Additionally, in certain embodiments, a state of the filter of the airflow control system 18 may affect the pressurization of the cab. For example, the fresh air blower may utilize more energy to draw air through a clogged filter than a clean filter. Accordingly, the adjustments may facilitate the target fresh airflow rate for the state of the filter. For example, the controller may determine the target fresh airflow rate and set the target door position 82 and the target capacities 84, 86 based on the target fresh airflow rate and the target total airflow rate. However, because the filter may be clogged, the pressure difference (e.g., the difference between the measured pressure within the cab and the target pressure) is greater than a threshold pressure difference. The controller may then increase the target fresh airflow rate to compensate for the pressure difference until the pressure difference is less than the pressure difference threshold.

In certain embodiments, the lookup table 80, is generated based on bench testing and then provided to controllers of multiple work vehicles 10. Additionally, while the illustrated lookup table 80 uses target total airflow rate and target fresh airflow rate as inputs, it should be appreciated that in other embodiments, inputs such as target temperature, target pressure, target recirculated airflow ratio, among others, or a combination thereof, may be included in the lookup table 80 (e.g., a 3, 4, 5, or 6 dimensional lookup table, etc.). Additionally, while the outputs of the lookup table 80 include the target door position 82, the target recirculated air blower capacity 84, and the target fresh air blower capacity 86, it should be appreciated that other outputs may be provided. For example, the outputs may include target cab temperature, target total power usage, target power efficiency, among others, or a combination thereof. Further, there may be any suitable quantity of rows 88 and/or columns 90, such as 2, 3, 4, 5, 6, 7, 8, or more, so that a corresponding quantity of cells 92 is provided.

By way of example, to generate the lookup table 80, a test work vehicle may be used. An operator or automatic device (e.g. controller) may set variables of the airflow control system, such as the door position 82, the recirculated air blower capacity 84, and the fresh air blower capacity 86. Then, the airflow control system may be calibrated. For example, the door may be moved from the first position to the second position while the blower capacities are held constant, and the resulting change in total airflow rate and the fresh airflow rate may be observed to establish a relationship between door position and total airflow rate and/or fresh airflow rate. This process may be repeated for each of the blower capacities, as well as any other suitable variables that affect the airflow control system (such as target cab temperature, external temperature, etc.). Thus, a lookup table 80 relating each fresh airflow rate and each total airflow rate to door position 82, recirculated air blower capacity 84, and fresh air blower capacity 86 may be established. The lookup table 80 may be distributed to controllers of many work vehicles 10. Additionally, a graph may be created from each rows 88, each columns 90, or both to visualize or the relationships between the variables, as described below with reference to FIGS. 4 and 5.

In certain embodiments, the controller may operate with relationships other than a lookup table 80. For example, the controller may determine target door positions and target blower capacities from relationships between the target fresh airflow rates and the target fresh airflow rates. In certain embodiments, the relationships may be determined from interpolation or extrapolation of data from the bench-testing. In certain embodiments, the relationships may be determined from one or more formulas (e.g., empirical formulas). Additionally, in certain embodiments, the relationships may be determined from a graph generated from the interpolation and/or the extrapolation, and/or a graph generated from a curve fit (e.g., least squares). The relationships and/or graphs may be interpolated by piecewise constant interpolation, linear interpolation, cosine interpolation, polynomial interpolation, Hermite interpolation, spline interpolation, Gaussian process interpolation, among others. Additionally, the graphs may be extrapolated by linear extrapolation, polynomial extrapolation, conic extrapolation, French curve extrapolation, among others. Further, there are other ways to express the relationships between target door position, target blower capacities, target fresh airflow rate, and target total airflow rate.

Figure 4:
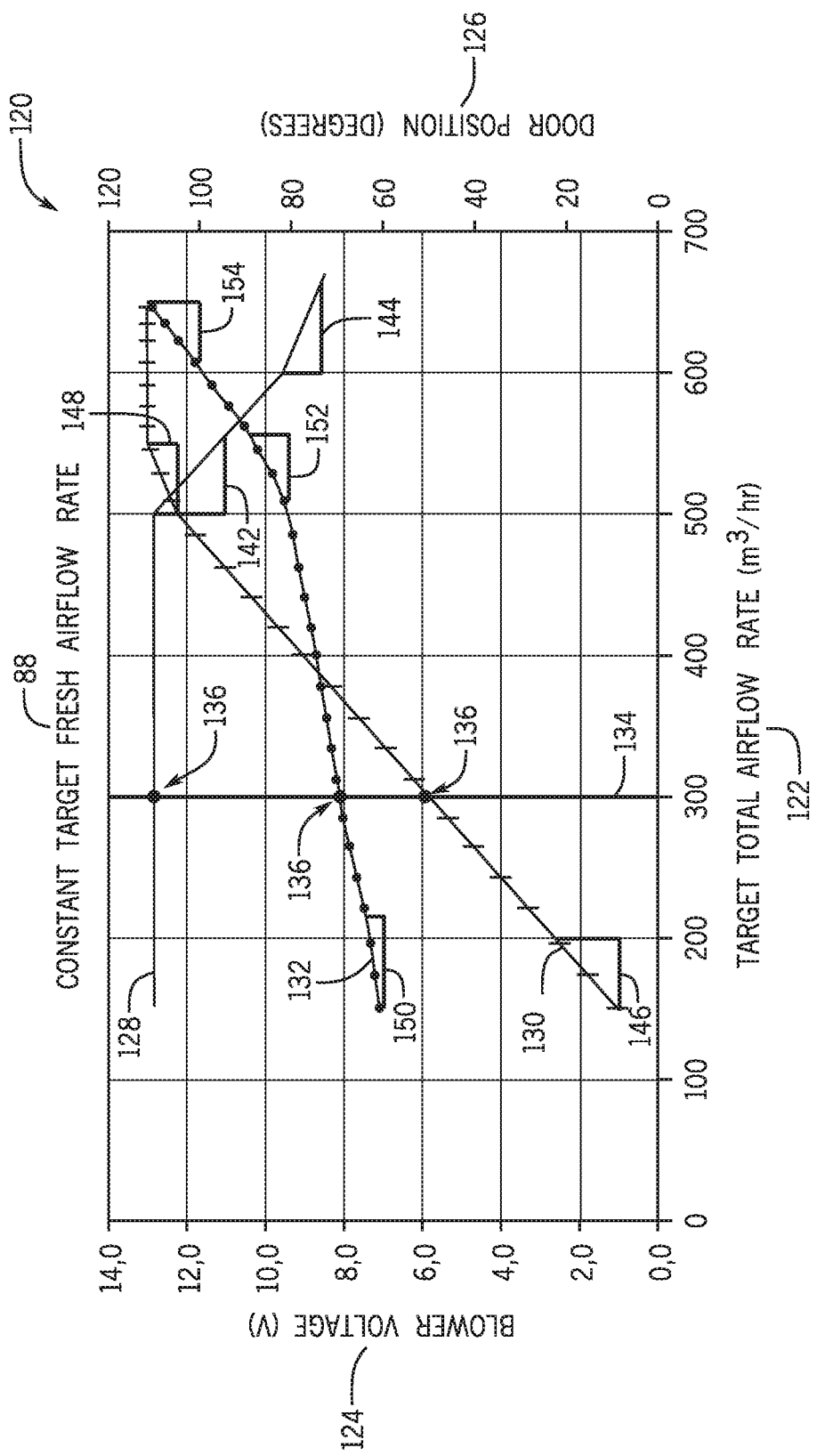
FIG. 4 is an embodiment of a graph that may be representative of a row of the lookup table of FIG. 3.

FIG. 4 is an embodiment of a graph 120 that may be representative of a row of the lookup table of FIG. 3. The graph 120 visually shows the relationships between the target door position and the target blower capacities to the target total airflow rate. For example, the target blower capacities are represented as voltages and the door position is represented in degrees. However, the blower capacities may be represented as voltages, angles of blades of the blowers, or any other suitable inputs to the blowers for adjusting the outputs of the blowers, or combinations thereof, instead of voltages. As illustrated, a horizontal axis 122 represents target total airflow rate in $m^3$/hour, a left vertical axis 124 represents blower voltage in volts, and a right vertical axis 126 represents door position in degrees. Additionally, a first curve 128 represents a relationship between target door position and target total airflow rate, a second curve 130 represents a relationship between target recirculated air blower voltage and target total airflow rate, a third curve 132 represents a relationship between target fresh air blower voltage and target total airflow rate, and a line 134 represents a selection of target total airflow rate. The first curve 122 is read with respect to the right vertical axis 126. The second curve 130 and the third curve 132 are read with respect to the left vertical axis 124. In this embodiment, a right vertical axis 126 value of 110 degrees corresponds to the first door position, and a value of 70 degrees corresponds to the second door position. Additionally, the line 134 is read with respect to the horizontal axis 122.

In the illustrated embodiment, the line 134 intersects the first curve 128, the second curve 130, and the third curve 132 at intersection points 136. The intersection points 136 indicate the target values of the door position and blower voltages for a row and for a column of the lookup table. For example, the intersection point 136 on the first curve indicates the target door position of 110 degrees, the intersection point 136 on the second curve indicates the target recirculated air blower voltage of 8.0 V, and the intersection point 136 on the third curve indicates the target fresh air blower voltage of 5.8 V. In certain embodiments, each row of the lookup table of FIG. 3 corresponds to a different graph 120. Each column of the lookup table is represented by a respective vertical line, such as the line 134, which may be moved along the horizontal axis 122 of a respective graph 120 to provide different target door positions and blower voltages depending on the target total airflow rate.

As illustrated by the first curve 128, the target door position varies over the range of target total airflow rates. For example, in the illustrated embodiment, the first curve 128 remains constant over a portion of the range of target total airflow rates before descending at a first slope 142 and then at a second slope 144. As illustrated, at low total airflow rates, the target door position is at the first position of 110 degrees, remains at the first position, then decreases at the first slope 142 toward the closed, second position. At a higher total airflow rate, the target door position decreases at the second slope 144 toward the closed, second position.

Similarly, the second curve 130 changes over the range of target total airflow rates. In the illustrated embodiment, the second curve 130 corresponds to the target recirculated air blower voltage 84. The second curve 130 increases at a third slope 146 as the target total airflow rate increases. The second curve then increases at a fourth slope 148 at approximately the same target total airflow rate that the first curve 128 changes. The second curve 130 then reaches a constant value.

Further, the third curve 132 represents the target fresh air blower voltage over a range of target total airflow rates. In the present embodiment, the target fresh air blower voltage has a fifth slope 150, such that the voltage increases linearly as the target total airflow rate increases. At the same target total airflow rate that the first curve 128 changes from constant to the first slope 142 and the second curve 130 changes from the third slope 146 to the fourth slope 148, the third curve changes to a larger sixth slope 152. The third curve 132 then later changes to a seventh slope 154 larger than the sixth slope 152.

As illustrated, at a target total airflow rate of 300 m³/hour, the intersection points 136 occur at a target fresh air blower voltage of 8.0 volts, at a target recirculated air blower voltage of 6 V, and at a target door position of 110 degrees. The door is fully open, such that the fresh air is provided substantially without mixing with recirculated air. The fresh air blower is also operating at a higher voltage and, therefore, may be operating at a higher capacity than the recirculated air blower. The curves 128, 130, and 132 shown here are examples of relationships of the door position, the target fresh air blower voltage, and the target recirculated blower voltage to the target total airflow rate for a particular target fresh airflow rate. In other embodiments, curves may have other shapes for the particular target fresh airflow rate. In addition, the curves may have other shapes for other target fresh airflow rates.

In the illustrated embodiment, a graph 120 is provided for each row of the lookup table of FIG. 3. Alternatively, a graph 120 may be provided for each column of the lookup table, corresponding to the different values of the target total airflow, as shown below with reference to FIG. 5. Additionally, graphs 120 may be provided for both the rows and the columns of the lookup table, or the controller may utilize the inputs, outputs, and intersections of the lookup table without any corresponding graphs 120.

Figure 5:
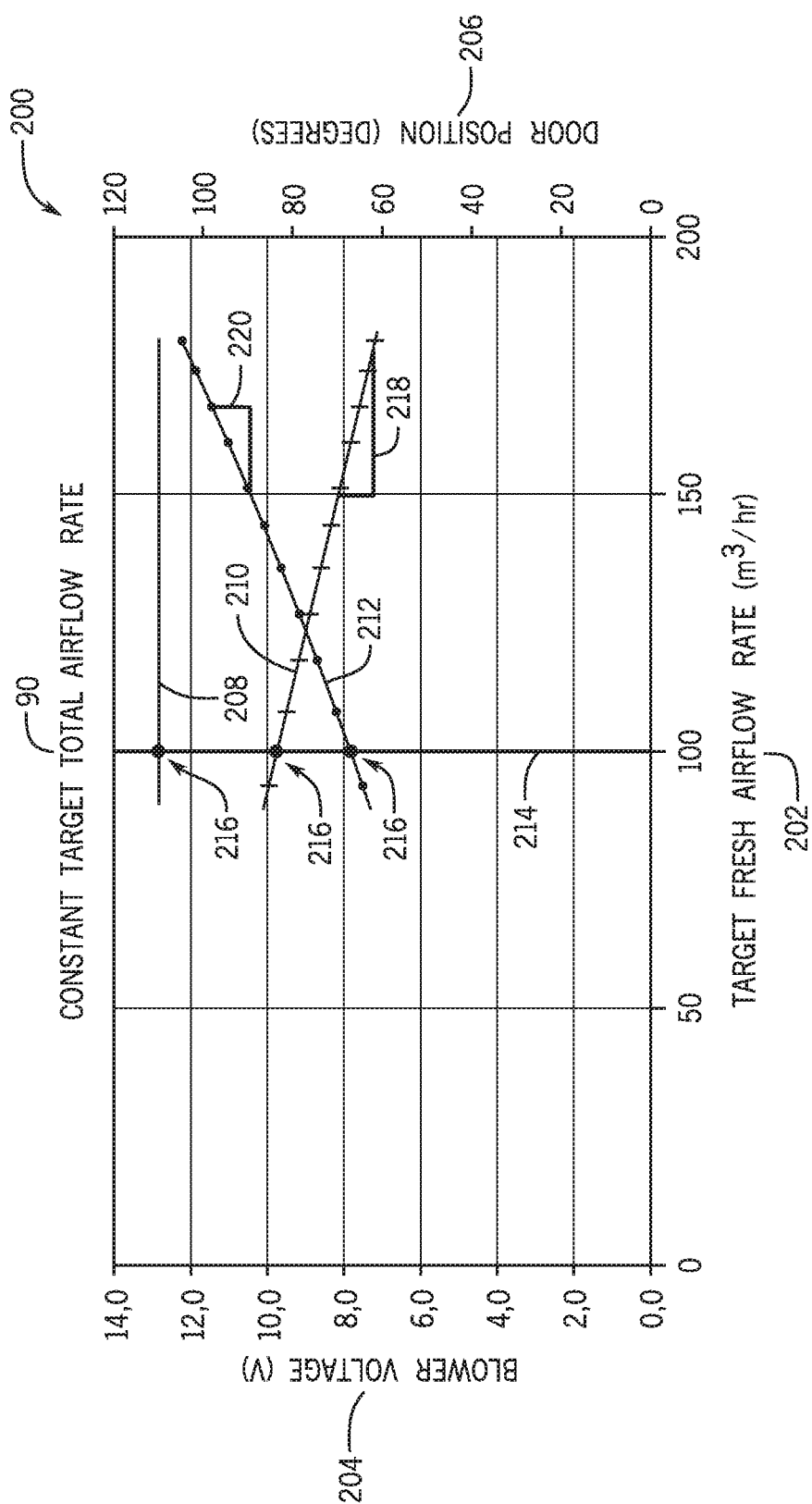
FIG. 5 is an embodiment of a graph that may be representative of a column of the lookup table of FIG. 3.

FIG. 5 is an embodiment of a graph 200 that may be representative of a column of the lookup table of FIG. 3. Accordingly, the graph 200 visually shows the relationships of the target door position and the target blower capacities to the target fresh airflow rate for a particular target total airflow rate. For example, the target blower capacities are represented as voltages and the door position is represented in degrees. However, the blower capacities may be represented as voltages, angles of blades of the blowers, or any other suitable inputs to the blowers for adjusting the outputs of the blowers, or combinations thereof, instead of voltages. As illustrated, a horizontal axis 202 represents target fresh airflow rate in m³/hour, a left vertical axis 204 represents blower voltage in volts, and a right vertical axis 206 represents door position in degrees. Additionally, a first curve 208 represents a relationship between target door position and target fresh airflow rate, a second curve 210 represents a relationship between target recirculated air blower voltage and target fresh airflow rate, a third curve 212 represents a relationship between target fresh air blower voltage and target fresh airflow rate, and a line 214 represents a selection of target fresh airflow rate. The first line 122 is read with respect to the right vertical axis 206. The second curve 210 and the third curve 212 are read with respect to the left vertical axis 204. In this embodiment, a right vertical axis 206 value of 110 degrees corresponds the first door position, and a value of 70 degrees corresponds to the second door position. Additionally, the line 214 is read with respect to the horizontal axis 202.

In the illustrated embodiment, the line 214 intersects the first curve 208, the second curve 210, and the third curve 212 at intersection points 216. The intersection points 216 indicate the target values of the door position and blower voltages for a row and for a column of the lookup table. For example, the intersection point 216 on the first line indicates the target door position of 110 degrees, the intersection point 216 on the first curve indicates the target recirculated air blower voltage of 9.7 V, and the intersection point 216 on the second curve indicates the target fresh air blower voltage of 7.9 V. In certain embodiments, each column of the lookup table of FIG. 3 corresponds to a different graph 200. Each row of the lookup table is represented by a respective vertical line, such as the line 214, which may be moved along the horizontal axis 202 of a respective graph 200 to provide different target door positions and blower voltages depending on the target fresh airflow rate.

As illustrated by the first curve 208, the target door position does not vary over the range of target fresh airflow rates for this particular target total airflow rate. For example, in the illustrated embodiment, the first curve 208 remains constant over the range of target fresh airflow rates. Furthermore, the second curve 210 indicates that the target recirculated air blower voltage changes over the range of target total airflow rates. In the illustrated embodiment, the second curve 210 decreases at a first slope 218 as the target fresh airflow rate increases. Additionally, the third curve 212 representative of the target fresh air blower voltage increases at a second slope 220 as the target fresh airflow rate increases.

As illustrated, at a target fresh airflow rate of 100 m³/hour, the intersection points 216 occur at a target door position of 110 degrees, at a target recirculated air blower voltage of 9.7 V, and at a target fresh air blower voltage of 7.9 V. Accordingly, the door is in the first position and is fully open, such that the fresh air is provided substantially without mixing with recirculated air. The recirculated air blower is also operating at a higher voltage than the fresh air blower and, therefore, may be operating at a higher capacity than the fresh air blower. As such, more recirculated air may be provided to the cab than fresh air from the external environment. The curves 208, 210, and 212 shown here are examples of relationships of the door position, the target fresh air blower voltage, and the target recirculated blower voltage to the target fresh airflow rate for a particular target total airflow rate. In other embodiments, curves may have other shapes for the particular target total airflow rate. In addition, the curves may have other shapes for other target total airflow rates.

In certain embodiments, the controller may use the chart 200 and the line 214 to identify a new target fresh airflow rate when the pressure difference (e.g., difference between the measured pressure within the cab and the target pressure set for the cab) is greater than a threshold. For example, as shown by line 214, the pressure difference may be greater than the threshold. In certain embodiments, the controller may move the line 214 to the right (e.g., generate a new line 214 that corresponds to a different target fresh airflow rate) until the pressure difference is less than the threshold. At this position, the line 214 is indicative of the new target fresh airflow rate.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An airflow control system of a work vehicle, comprising:

a controller having a memory and a processor, wherein the controller is configured to:

determine a target position of a door of an airflow control assembly, a first flow rate of a first airflow from a recirculated air blower, and a second flow rate of a second airflow from a fresh air blower based at least in part on a target total airflow rate into an interior of a cab of the work vehicle and a target fresh airflow rate into the interior of the cab, wherein the airflow control assembly is configured to provide the fresh air blower with a mixture of fresh air and recirculated air, and the mixture of the fresh air and the recirculated air is based on a position of the door of the airflow control assembly; and instruct the airflow control assembly to move the door to the target position, instruct the recirculated air blower to output the first airflow at the first flow rate, and instruct the fresh air blower to output the second airflow at the second flow rate.

2. The airflow control system of claim 1, wherein the controller is configured to determine the target fresh airflow rate based at least in part on a target pressure within the interior of the cab.

3. The airflow control system of claim 2, wherein the controller is configured to set the target pressure within the interior of the cab to a normal target during normal operation of the airflow control system and to a cool down phase target during a cool down phase of the airflow control system.

4. The airflow control system of claim 2, comprising a pressure sensor configured to fluidly couple to the interior of the cab and to output a signal indicative of a determined pressure within the interior of the cab.

5. The airflow control system of claim 4, wherein the controller is configured to compare the determined pressure to the target pressure to determine the target fresh airflow rate.

6. The airflow control system of claim 1, wherein a lookup table is stored in the memory of the controller, and the lookup table comprises:

rows, each corresponding to a first respective value of a first input;

columns, each corresponding to a respective value of a second input; and cells at the intersections between the rows and the columns, wherein the cells comprise outputs related to the first and the second inputs, wherein the first input is the target total airflow rate and the second input is the target fresh airflow rate, or the first input is the target fresh airflow rate and the second input is the target total airflow rate, and wherein the outputs comprise the target position of the door, the first flow rate of the first airflow, and the second flow rate of second airflow.

7. The airflow control system of claim 6, comprising a chart corresponding to one row or one column of the lookup table, wherein for each respective value of the first input or each respective value of the second input, the chart comprises a relationship between the other input and the outputs.

8. An airflow control system of a work vehicle, comprising:

an airflow control assembly having a door, wherein the airflow control assembly is configured to provide a fresh air blower with a fresh airflow comprising a mixture of fresh air and recirculated air, and the mixture of the fresh air and the recirculated air of the fresh airflow is based on a position of the door;

the fresh air blower configured to establish the fresh airflow from the airflow control assembly;

a recirculated air blower configured to establish a recirculated airflow from an interior of a cab of the work vehicle;

a pressure sensor fluidly coupled to the interior of the cab and configured to send a first signal representative of the pressure within the cab to a controller of the airflow control system; and a controller having a memory and a processor, wherein the controller is communicatively coupled to the pressure sensor, the recirculated air blower, the fresh air blower, and the airflow control assembly, wherein the controller is configured to:

determine a target position of the door, a first flow rate of the recirculated airflow from the recirculated air blower, and a second flow rate of the fresh airflow from the fresh air blower based at least in part on a target total airflow rate into the interior of the cab and a target fresh airflow rate into the interior of the cab; and instruct the airflow control assembly to move the door to the target position, instruct the recirculated air blower to output the recirculated airflow at the first flow rate, and instruct the fresh air blower to output the fresh airflow at the second flow rate.

9. The airflow control system of claim 8, comprising a user interface communicatively coupled to the controller, wherein the user interface is configured to output a second signal indicative of the target total airflow rate.

10. The airflow control system of claim 8, wherein the controller is configured to determine the target fresh airflow rate based at least in part on a target pressure within the interior of the cab.

11. The airflow control system of claim 8, wherein a lookup table is stored in the memory of the controller, and the lookup table comprises:

rows, each corresponding to a first respective value of a first input;

columns, each corresponding to a respective value of a second input; and cells at the intersections between the rows and the columns, wherein the cells comprise outputs related to the first and the second inputs, wherein the first input is the target total airflow rate and the second input is the target fresh airflow rate, or the first input is the target fresh airflow rate and the second input is the target total airflow rate, and wherein the outputs comprise the target position of the door, the first flow rate of the first airflow, and the second flow rate of second airflow.

12. The airflow control system of claim 8, comprising a chart corresponding to one row or one column of the lookup table, wherein for each respective value of the first input or each respective value of the second input, the chart comprises a relationship between the other input and the outputs.

13. The airflow control system of claim 8, wherein the controller is configured to set the target pressure within the interior of the cab to a normal target during normal operation of the airflow control system and to a cool down phase target during a cool down phase of the airflow control system.

14. The airflow control system of claim 8, wherein the airflow control system does not include an airflow sensor.

15. A method for controlling an airflow through an interior of a cab of a work vehicle, comprising:

determining, via a controller, a target position of a door of an airflow control assembly, a first flow rate of a first airflow from a recirculated air blower, and a second flow rate of a second airflow from a fresh air blower based at least in part on a target total airflow rate into an interior of the cab of the work vehicle and a target fresh airflow rate into the interior of the cab, wherein the airflow control assembly is configured to provide the fresh air blower with a mixture of fresh air and recirculated air, and the mixture of the fresh air and the recirculated air is based on a position of the door;

instructing, via the controller, the airflow control assembly to move the door to the target position;

instructing, via the controller, the recirculated air blower to output the first airflow at the first flow rate; and instructing, via the controller, the fresh air blower to output the second airflow at the second flow rate.

16. The method of claim 15, comprising determining, via the controller, the target fresh airflow rate into the cab based at least in part on a target pressure within the interior of the cab.

17. The method of claim 15, comprising setting, via the controller, a target pressure within the interior of the cab to a normal target during normal operation of the airflow control system and to a cool down phase target during a cool down phase of the airflow control system.

18. The method of claim 15, comprising utilizing, via the controller, a lookup table stored in a memory of the controller, wherein the lookup table comprises:

rows, each corresponding to a first respective value of a first input;

columns, each corresponding to a respective value of a second input; and cells at the intersections between the rows and the columns, wherein the cells comprise outputs related to the first and the second inputs, wherein the first input is the target total airflow rate and the second input is the target fresh airflow rate, or the first input is the target fresh airflow rate and the second input is the target total airflow rate, and wherein the outputs comprise the target position of the door, the first flow rate of the first airflow, and the second flow rate of second airflow.

19. The method of claim 15, comprising utilizing, via the controller, a chart corresponding to one row or one column of the lookup table, wherein for each respective value of the first input or each respective value of the second input, the chart comprises a relationship between the other input and the outputs.

20. The method of claim 15, comprising determining, via the controller, whether a measured pressure within the interior of the cab is within a threshold of a target pressure within the interior of the cab, and instructing, via the controller, the fresh air blower to increment the second flow rate of the second airflow if the controller determines that the pressure of the cab is not within the threshold.

* * * * *